United States Patent [19]

Benton

[11] 4,187,702
[45] Feb. 12, 1980

[54] LOCKING ADAPTER FOR TRAILER TOWING MIRROR

[76] Inventor: Marvin E. Benton, 1252 E. Willow, Anaheim, Calif. 92806

[21] Appl. No.: 945,304

[22] Filed: Sep. 25, 1978

[51] Int. Cl.$^2$ ............................................. E05B 65/00
[52] U.S. Cl. ............................................ 70/57; 70/258
[58] Field of Search ................. 70/14, 19, 57, 58, 237, 70/258; 248/466; 403/43, 46; 285/80, 92; D12/187

[56] References Cited

U.S. PATENT DOCUMENTS

| | | | |
|---|---|---|---|
| 1,061,060 | 5/1913 | Ford | 403/46 |
| 1,321,113 | 11/1919 | Longren | 403/46 |
| 1,877,370 | 9/1932 | Streit | 403/46 |
| 3,851,978 | 12/1974 | Kuipers | 403/46 |

Primary Examiner—Robert L. Wolfe
Attorney, Agent, or Firm—Edward D. O'Brian; K. H. Boswell

[57] ABSTRACT

A locking device used to lock a trailer towing mirror to a vehicle is disclosed. The trailer towing mirror is of the type which is mounted between the seam bisecting the hood and fender of the vehicle and the edge of the wheel well of a fender of the vehicle and has a plurality of supports which connect to the vehicle and which connect to each other and are fixed in relationship with respect to one another by at least one turnbuckle. The locking device includes an elongated member having a first end and a second end and is formed of a material substantially resistant to sundering. In the first end of the member is a first hole of sufficient dimension to fit over one of the supports and in the second end of the member is a second hole of sufficient dimension to allow a shank of a lock to pass through the second hole. The second end of the member is dimensioned such that at least a portion of the second end of the member can be passed through the central opening of the turnbuckle to an extent such that the second hole is on the opposite side of the turnbuckle from the majority of the elongated member. The member is fixed in the turnbuckle by passing the lock shank through the second hole and securing the lock.

7 Claims, 9 Drawing Figures

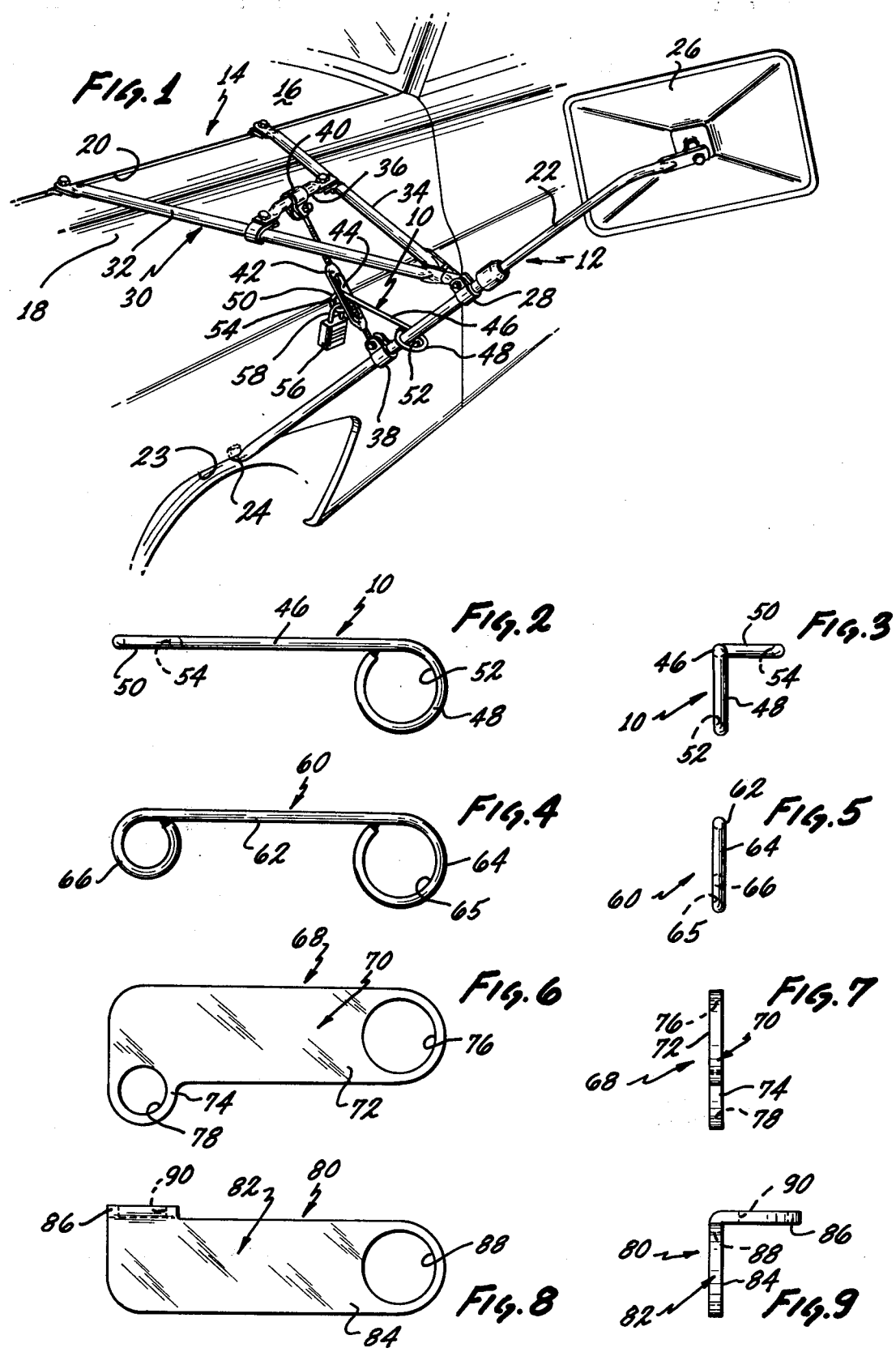

LOCKING ADAPTER FOR TRAILER TOWING MIRROR

BACKGROUND OF THE INVENTION

This invention is directed to a locking device which is used to fix a trailer towing mirror to a vehicle so that the trailer towing mirror cannot be removed by unauthorized persons.

Automobiles and small trucks are sometimes equipped to pull trailers, boats, cement mixers and the like. These components which are being pulled are fixed to the towing vehicle by a typical trailer hitch. If the object being towed such as a house trailer inhibits the driver's view through the rear-view window, it effectively renders inoperative the use of standard rear-view mirrors. In order to allow the driver of a vehicle to see behind him there are presently on the market several styles of outboard mirrors which attach to the vehicle and extend a sufficient distance to the side of the vehicle to allow the vehicle operator to see behind the trailer or other large object being towed.

The most common style outboard or trailer towing mirror has a centralized support having the mirror attached to the upper end and having a small lip or curled member on the other end which fits underneath the edge of the vehicle's fender. To a hinging bracket attached near the center of the main support is hinged a composite of three members attached to each other to form an A-frame. At the apex of the "A" is the hinging point which attaches to the main support and at the bottom of each respective leg of the "A" is an attachment piece which fits in the seam dividing the top of the fender and the hood of the vehicle. The mirror is attached to the car by inserting the attachment piece into the seam and the lip around the bottom of the fender and bringing the main support toward the A-frame by turning a turnbuckle which is attached to the crossmember of the A-frame and to a bracket positioned in between the hinge bracket and the curled member of the main support. The turnbuckle is turned until the fender of the vehicle is essentially wedged between the end of the legs of the A-frame and the bottom of the main support.

Once fastened to the vehicle these trailer towing mirrors can be removed in three ways. The first, of course, is that the vehicle operator purposely removes the mirror. A second removal, an unauthorized removal, results when someone other than an authorized person removes the mirror. The additional method is an accidental method which can result from use of the vehicle on very rough or uneven terrain which causes severe vibrations to be transmitted to the mirror resulting in the turnbuckle becoming loose and the mirror falling off.

In view of the second and third methods of removal delineated above there exists a need for a device which will lock the mirror to the vehicle and prevent unauthorized or inadvertent removal of the mirror from the vehicle.

BRIEF SUMMARY OF THE INVENTION

It is an object of this invention to provide a locking device which will prevent both unauthorized and inadvertent removal of a trailer towing mirror from the vehicle to which it is attached. It is a further object of this invention to provide a locking device that is both simple in construction and economically produced such that it can be easily used and yet inexpensive to buy. It is a further object of the invention to provide a locking device which is resistant to tampering, e.g., unauthorized sawing or cutting of the device.

In view of the above these and other objects which will become apparent from the remainder of this specification are met by providing a locking device for locking a trailer towing mirror to a vehicle, the trailer towing mirror being of the type having at least two supports, one support hinged upon the other, a turnbuckle attaching to and capable of maintaining said supports in a fixed relationship with respect to one another and to the vehicle to which the trailer towing mirror is attached, said turnbuckle of the type having a right-handed threaded hole in one end of the turn buckle and a left-handed threaded hole in the other end and a central opening the locking device which comprises: an elongated member having a first end and a second end, said elongated member being formed of a material substantially resistant to sundering, said first end of said member including a first hole, said first hole dimensioned such that one of its supports fits through said first hole and retains said elongated member on said support, said second end of said elongated member including a hole and said second end being so dimensioned that at least a portion of said second end will pass through the central opening in the turnbuckle, said second hole positioned in said second end such that when said second end is passed through said turnbuckle said hole and said second end lies on the opposite side of said turnbuckle from the rest of the elongated member, a lock including a shank, said second hole dimensioned such that such shank fits in said hole and when said shank is in said hole said second end of said member is inhibited from passing through the central hole in the turnbuckle.

BRIEF DESCRIPTION OF THE DRAWINGS

The invention will be better understood when taken in conjunction with the drawing in which:

FIG. 1 shows an isometric view of a first embodiment of the locking device of the invention attached to a typical trailer towing mirror;

FIG. 2 is a plan view of the locking device shown in FIG. 1;

FIG. 3 is an end view of the device shown in FIG. 2;

FIG. 4 is a plan view of a second embodiment of the locking device of the invention;

FIG. 5 is an end view of the locking device shown in FIG. 4;

FIG. 6 is a plan view of a third embodiment of the invention;

FIG. 7 is an end view of the embodiment shown in FIG. 6;

FIG. 8 is a plan view of a fourth embodiment of the invention; and

FIG. 9 is an end view of the embodiment shown in FIG. 8.

The invention described in this specification and as illustrated in the drawing utilizes certain principles and concepts which are set forth and defined in the claims appended to the end of this specification. It is to be realized that those skilled in the art could easily apply the concepts or principles of the invention to several differently appearing or differently described embodiments. For this reason the invention is not to be construed as to be limited to the exact embodiments herein described but is only to be construed in light of the appended claims.

DETAILED DESCRIPTION

In FIG. 1 there is shown an embodiment of the locking device 10 which is attached to a trailer towing mirror 12 which in turn is attached to a vehicle (a portion of which is shown as 14 in the figure). While towing mirror 12 and vehicle 14 do not comprise an integral part of this invention, they are necessary for the purpose of this specification to illustrate how the locking device interacts with them and as such, they are shown for the purposes of illustration.

Shown on vehicle 14 is a section of its hood 16 and fender 18. The space or crack 20 in between the fender 18 and hood 16 is utilized to mount certain portions of the mirror frame and the wheel well edge 23 of fender 18 is utilized to mount the remaining portion of the towing mirror 12. The typical towing mirror 12 on which the locking device 10 is used has a main support 22 which has a lip 24 on the lower end thereof. On the upper end of the main support 22 is a mirror 26. Intermittent mirror 26 and lip 24 is a hinged bracket 28. Attaching to the hinged bracket 28 is an A-frame component 30 which is composed of two legs 32 and 34, respectively, and a cross-brace 36. At the end of legs 32 and 34 are two attaching members which are not shown in the drawing, being hidden by the hood component 16. On main support 22, spaced in between hinge bracket 28 and lip 24, is an attaching bracket 38. An identical attaching bracket 40 is attached to cross-brace 36. A standard turnbuckle 42 having a left-hand screw thread in one end and a right-hand screw thread in the other end and two threaded bolts fitting into the screw threads is used to turn the A-frame 30 about hinge bracket 28, tightening A-frame 30 and main support 22 on to fender 18 holding the towing mirror 12 to vehicle 14. The turnbuckle 42 is a standard type having a central opening 44 extending through it.

As is illustrated in FIGS. 3 and 4 the first embodiment of the locking device 10 is composed of a central rod 46 which is curled about itself on both ends forming a large loop 48 and a small loop 50. The hole 52 in large loop 48 is sufficiently large such that the main support 22 fits into hole 52 and maintains the locking device 10 in between hinge bracket 28 and attaching bracket 38 (bracket 38 is removed to insert support 22 into large loop 48). In respect to large loop 48, small loop 50 is turned about the longitudinal axis of the rod 46 approximately 90 degrees. As can be seen in FIG. 1, this allows the small loop 50 to fit into and through central opening 44 in turnbuckle 42 when—and only when—the central opening 44 is in an approximately vertical position. The small loop 50 forms a small hole 54 in the locking device 10 and when the small loop 50 is passed through the central opening 44 in the turnbuckle 42 small hole 54 comes to rest on the bottom side of the turnbuckle 42. A lock 56 having a shank 58 is used to secure the locking device 10 to the turnbuckle 42 by passing shank 58 through small hole 54 after small loop 50 is inserted through central opening 44 in turnbuckle 42. When in this position and when lock 56 is snapped closed, the turnbuckle 42 is prohibited from turning which prevents spreading A-frame 30 with respect to main support 22 and prevents removal of towing mirror 12 from vehicle 14.

In FIGS. 4 and 5 there is shown a second embodiment of the invention. This embodiment is very similar to the first embodiment previously described in that locking device 60 has a rod 62 which is curled about itself on both ends forming a large loop 64 at one end and a small loop 66 at the other end. The device 60 differs from the device 10 in respect to the spatial placement of the large loop 64 and small loop 66. In this embodiment both large loop 64 and small loop 66 lie in the same plane. Thus, small loop 66 can only pass through the central opening of a turnbuckle 42 when said central opening is in an approximately horizontal position. As with locking device 10, locking device 60 is maintained on the towing mirror 12 by passing main support 22 through large loop 65.

In FIGS. 6 and 7 there is shown a third embodiment of the invention. Locking device 68 is composed of a flat plate 70 having a long arm 72 and a short arm 74 projecting substantially perpendicular to long arm 72 and in the same plane as long arm 72. In the end of long arm 72 is a large hole 76 serving the same function as hole 52 previously described. In the end of short arm 74 is a small hole 78 serving the same function as small hole 54; however, in use, locking device 68 would fit into an approximately horizontal opening in a turnbuckle 42 in the same manner as locking device 60.

In FIGS. 8 and 9 there is shown a fourth embodiment of the invention. Locking device 80 is composed of a flat plate 82 having a long arm 84 and a short arm 86. A large hole 88 in long arm 84 serves the same function as large hole 52. The short arm 86 has a small hole 90 serving the same function as small hole 54. Locking device 80 differs from locking device 68 in that the short arm 86 lies in a plane which is perpendicular to the plane of long arm 84. Thus, use of locking device 80 would be similar to use of locking device 10 in that the opening in the turnbuckle 54 would be in a vertical or essentially vertical direction.

All of the locking devices 10, 60, 68 and 80 would preferably be formed of a hard metal such as tool steel which presents sufficient resistance to cutting to impede or inhibit unauthorized destruction of the locking device by an unscrupulous person. Locking devices 10 and 60 would be formed from an integral steel rod which is bent around a jig and then welded to itself. Locking devices 68 and 80 would be formed from a single plate which is drilled and stamped to the proper shape and for locking device 80 this plate is then bent to give preferred configuration of the final product.

For the purposes of this specification locking devices 10 and 80 are shown such that the two loops or plates are essentially at 90 degree angles with respect to each other. However, other angles could also be used which would require simply orienting the opening in the turnbuckle somewhere in between the horizontal and vertical positions.

I claim:

1. A locking device for locking a trailer towing mirror to a vehicle, the trailer towing mirror of the type having at least two supports, one support hinged upon the other support, a turnbuckle attaching to and capable of maintaining said supports in a fixed relationship with respect to one another and to the vehicle to which the trailer towing mirror is attached, said turnbuckle of the type having a right-hand threaded hole in one end and a left-hand threaded hole in the other end, and a central opening, the improvement which comprises:

an elongated member having a first end and a second end;
said elongated member being formed of a material substantially resistant to sundering;
said first end of said member including a first hole;
said first hole dimensioned such that one of said supports fits through said first hole retaining said elongated member on said support;
said second end of said elongated member including a second hole;
said second end of said member being dimensioned such that at least a portion of said second end of said member is capable of passing through said central opening in said turnbuckle;
said second hole positioned in said second end such that when said second end is passed through said central opening in said turnbuckle,
said hole in said second end lies on the opposite side of said turnbuckle from the majority portion of said elongated member;
a lock;
said lock including a shank;
said hole in said second end dimensioned to receive said shank of said lock such that when said second end of said member is passed through said central opening in said turnbuckle and said shank of said lock is passed through said hole in said second end, said lock inhibits said second end of said member from passing back through said central hole in said turnbuckle, retaining said member in said central opening in said turnbuckle and inhibiting rotary movement of said turnbuckle.

2. The locking device of claim 1 wherein:
said elongated member comprises a rod;
said rod bent back upon itself at said first end to form a large loop;
said rod bent back upon itself at said second end to form a small loop;
said small loop being dimensioned such that said small loop is capable of passing through said central opening in said turnbuckle;
said shank of said lock passing through said small loop and said support passing through said large loop.

3. The locking device of claim 2 wherein:
said rod is twisted about its longitudinal axis such that said small loop lies in a first plane and said large loop lies in a second plane, said first and said second plane intersecting at a line coincidental with the longitudinal axis of said rod.

4. The locking device of claim 3 wherein:
said first plane and said second plane intersect at about a 90 degree angle.

5. The locking device of claim 1 wherein:
said elongated member comprises a first elongated plate, said plate having a first end and a second end, said first end including a first hole; a second plate, said second plate integrally formed with said second end of said first plate and projecting substantially normal to said first elongated plate, said second plate including a second hole.

6. The locking device of claim 5 wherein:
said second plate is bent about a line which is parallel to the longitudinal axis of said first plate such that said second plate intersects said first plate at an angle.

7. The locking device of claim 6 wherein:
said angle is about 90 degrees.

* * * * *